United States Patent [19]

Anderson et al.

[11] 3,919,312
[45] Nov. 11, 1975

[54] INTERMEDIATES FOR PREPARING ACRIDINES

[75] Inventors: Elvin L. Anderson, Moorestown, N.J.; Harold Graboyes, Philadelphia, Pa.

[73] Assignee: SmithKline Corporation, Philadelphia, Pa.

[22] Filed: Sept. 10, 1973

[21] Appl. No.: 395,483

Related U.S. Application Data

[60] Division of Ser. No. 267,852, June 30, 1972, Pat. No. 3,781,358, which is a division of Ser. No. 118,976, Feb. 25, 1971, Pat. No. 3,692,834, which is a continuation-in-part of Ser. No. 732,869, May 29, 1968, Pat. No. 3,625,945.

[52] U.S. Cl............ 260/554; 260/552 SC; 260/279
[51] Int. Cl.$^2$.............. C07C 133/02; C07C 159/00
[58] Field of Search...................... 260/554, 552 SC

[56] References Cited
UNITED STATES PATENTS
2,530,430   11/1950   Hirt............................ 260/552 SC OTHER PUBLICATIONS
Albert, Chem Abstracts, col. 647, Vol. 43 (1949).

*Primary Examiner*—James O. Thomas, Jr.
*Assistant Examiner*—G. Breitenstein
*Attorney, Agent, or Firm*—Joan S. Keps; Richard D. Foggio; William H. Edgerton

[57] ABSTRACT

Diphenyl-2-carboxaldehyde derivatives, prepared by reacting a diphenylamine-2-carboxylic acid benzenesulfonylhydrazide with a base and hydrazine, semicarbazide, thiosemicarbazide or phenylhydrazine, are reacted with a mineral acid to produce acridines. The acridines are useful as intermediates for preparing 9-aminoalkylacridans having pharmacodynamic activity.

2 Claims, No Drawings

INTERMEDIATES FOR PREPARING ACRIDINES

This is a division of application Ser. No. 267,852, filed June 30, 1972 now Pat. No. 3,781,358 which is a division of application Ser. No. 118,976, filed Feb. 25, 1971, now Pat. No. 3,692,834, which is a continuation-in-part of Ser. No. 732,869, filed May 29, 1968, now Pat. No. 3,625,945.

This invention relates to new diphenyl-2-carboxaldehyde derivatives which are useful as intermediates for preparing acridines.

The acridines prepared from the intermediates of this invention are represented by the following formula:

FORMULA I

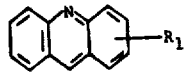

in which $R_1$ is hydrogen, halogen having an atomic weight of less than 80, lower alkyl, lower alkoxy, trifluoromethyl, trifluoromethylsulfonyl, dimethylsulfamoyl or lower alkylthio.

The acridines of Formula I are useful as intermediates for preparing 9-aminoalkylacridans having pharmacodynamic activity as described in U.S. Pat. No. 3,131,190. Briefly, an acridine of Formula I is reacted with an alkylaminopropyl magnesium halide in an inert organic solvent such as an ether at about 35°–100°C. for about 30–180 minutes to give a 9-aminoalkylacridan which is, or is an intermediate for, a pharmacodynamically active compound as described in U.S. Pat. No. 3,131,190. These pharmacodynamically active 9-aminoalkylacridans have central nervous system activity and are useful as tranquilizers, ataractics, antidepressants, antiemetics, antihistaminics, antispasmodics and antiinflammatory agents.

An advantageous compound of Formula I is that in which $R_1$ is chloro, in particular, in the 2-position, that compound being 2-chloroacridine. This acridine is an intermediate in the preparation of 9-aminoalkyl-2-chloroacridans, in particular, 2-chloro-9-dimethylaminopropylacridan which is a known tranquilizing agent, Simpson et al., Current Therapeutic Research 8:447–451 (1966) and Claghorn et al., Psychosomatics 8:212–215 (1967).

The process for preparing the acridines of Formula I using the intermediates of this invention is represented schematically as follows:

in which:
$R_1$ is hydrogen, halogen having an atomic weight of less than 80, lower alkyl, lower alkoxy, trifluoromethyl, trifluoromethylsulfonyl, dimethylsulfamoyl or lower alkylthio;

$R_3$ and $R_4$ are hydrogen, halogen having an atomic weight of less than 80, lower alkyl, lower alkoxy, trifluoromethyl, trifluoromethylsulfonyl, dimethylsulfamoyl or lower alkylthio, at least one of $R_3$ and $R_4$ being hydrogen;

$R_2$ is

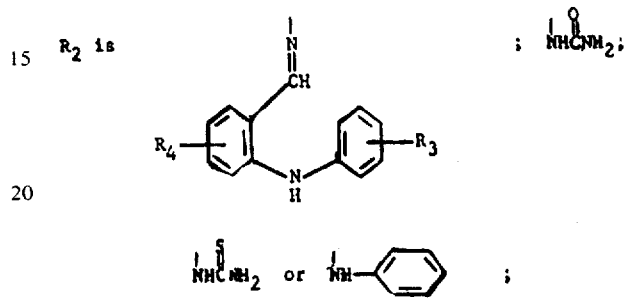

and

Ar is phenyl, tolyl preferably p-tolyl or dihalophenyl preferably 2,5-dichlorophenyl.

The intermediates of this invention are represented by Formula III above.

Preferred intermediates of this invention are represented by Formula III above when $R_2$ is

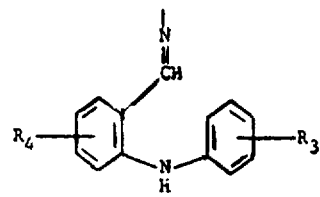

and one of $R_3$ and $R_4$ is chloro and the other is hydrogen, the chloro substituent being in the position para to the attachment of the nitrogen atom.

According to the above process, a diphenylamine-2-carboxylic acid benzenesulfonylhydrazide of Formula II is reacted with a base such as an alkali metal hydroxide, for example, sodium or potassium hydroxide, or an alkali metal carbonate, for example sodium or potas-

FORMULA II          FORMULA III

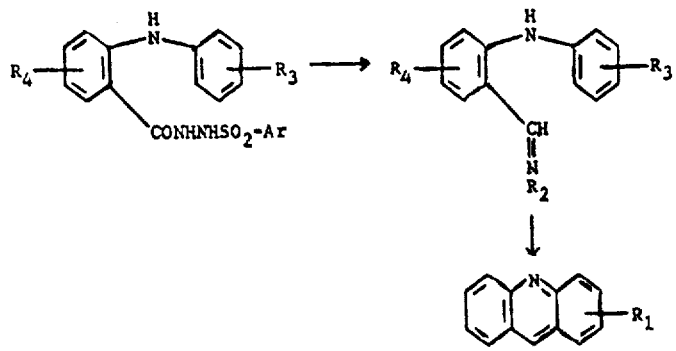

sium carbonate, and a member selected from the group consisting of hydrazine, semi-carbazide, thiosemicarbazide and phenylhydrazine to give a diphenylamine-2-carboxaldehyde derivative of Formula III. This reaction is carried out in an organic solvent preferably a hydroxylic solvent such as, for example, β-ethoxyethanol, β-methoxyethanol, ethylene glycol, butanol or amyl alcohol, advantageously in an aqueous solution with a water miscible hydroxylic solvent such as β-ethoxyethanol or β-methoxyethanol. The reaction is carried out at elevated temperature preferably about 100°–200°C., conveniently at reflux temperature.

The above prepared diphenylamine-2-carboxaldehyde derivatives are reacted with a mineral acid such as, for example, hydrochloric acid, sulfuric acid or phosphoric acid to give the acridines. The reaction is carried out in an organic solvent, for example, a lower alkanoic acid such as acetic or formic acid or a hydraulic solvent such as β-ethoxyethanol, β-methoxyethanol or ethylene glycol, preferably a lower alkanoic acid. Preferably, the reaction is carried out at elevated temperature, such as, for example, about 100°–200°C.

The diphenylamine-2-carboxylic acid benzenesulfonylhydrazide compounds are prepared as follows:
1. by reacting a diphenylamine-2-carboxylic acid with a chlorinating agent, for example, thionyl chloride, to give the corresponding carboxylic acid chloride and reacting the acid chloride with a benzenesulfonylhydrazine or
2. by reacting a lower alkyl ester of a diphenylamine-2-carboxylic acid with hydrazine and benzenesulfonyl chloride.

The diphenylamine-2-carboxylic acids are either known to the art or are prepared by known methods, for example, by reacting an aniline with an o-halobenzoic acid or by reacting an o-aminobenzoic acid with a halobenzene.

The following examples are not limiting but are illustrative of this invention.

EXAMPLE 1

A mixture of 247.5 g. of 4'-chlorodiphenylamine-2-carboxylic acid, 135 g. of thionyl chloride and 2 liters of cyclohexane is heated at reflux for 1 hour with mechanical stirring. The resulting solution is cooled to 40°–50°C. and 223 g. of p-toluenesulfonylhydrazine is added. The mixture is then heated under reflux for 6 hours with stirring, then cooled and filtered. The solid material is dried in vacuo to give 4'-chlorodiphenylamine-2-carboxylic acid p-toluenesulfonylhydrazide.

A mixture of 104 g. of 4'-chlorodiphenylamine-2-carboxylic acid p-toluenesulfonylhydrazide, 50 ml. of 10N sodium hydroxide, 400 ml. of β-ethoxyethanol, 250 ml. of water and 15 g. of 85% hydrazine hydrate is heated at reflux for two hours with mechanical stirring. The mixture is cooled and filtered. The solid material is dried in vacuo to give 4'-chlorodiphenylamine-2-carboxaldehyde azine.

A mixture of 131 g. of 4'-chlorodiphenylamine-2'-carboxaldehyde azine, 400 ml. of glacial acetic acid and 122 ml. of concentrated hydrochloric acid is heated at reflux with mechanical stirring for one hour. The solution is diluted with ice and water, basified with sodium hydroxide solution and filtered. Drying the solid material in vacuo gives 2-chloroacridine.

EXAMPLE 2

A mixture of 50 g. of 4'-trifluoromethyldiphenylamine-2-carboxylic acid, 24 g. of thionyl chloride and 500 ml. of cyclohexane is heated at reflux with mechanical stirring for 1 hour. The solution is cooled to 40°–50°C. and 37.2 g. of p-toluenesulfonylhydrazine is added. The resulting mixture is heated for six hours at reflux, cooled and the insoluble solid is removed by filtration and dried in vacuo to give 4'-trifluoromethyldiphenylamine-2-carboxylic acid p-toluenesulfonylhydrazide.

A mixture of 272 g. of 4'-trifluoromethyldiphenylamine-2-carboxylic acid p-toluenesulfonylhydrazide, 120 ml. of 10N sodium hydroxide, 1.1 liter of β-ethoxyethanol, 680 ml. of water and 36.5 g. of 85% hydrazine hydrate is heated at reflux with mechanical stirring for 2 hours. The mixture is cooled and the solid removed by filtration and dried in vacuo to give 4'-trifluoromethyldiphenylamine-2-carboxaldehyde azine.

A mixture of 90 g. of 4'-trifluoromethyldiphenylamine-2-carboxaldehyde azine, 270 ml. of glacial acetic acid and 73 ml. of concentrated hydrochloric acid is heated at reflux with mechanical stirring for one hour. The solution is diluted with ice and water and basified with sodium hydroxide solution. The solid material is removed by filtration and dried in vacuo to give 2-trifluoromethylacridine.

EXAMPLE 3

A mixture of 156.5 g. of o-chlorobenzoic acid, 167.2 g. of p-(n-butyl)aniline, 69 g. of potassium carbonate, 1 g. of copper-bronze powder and 350 ml. of isoamyl alcohol is heated at reflux with mechanical stirring for four hours. During this time the water which formed is removed by azeotropic distillation. The inorganic salts are removed by filtration and 30 ml. of glacial acetic acid is added to the filtrate. After cooling, the solid material is removed by filtration and dried in vacuo to give 4'-(n-butyl)diphenylamine-2-carboxylic acid.

A mixture of 26.9 g. of 4'-(n-butyl)diphenylamine-2-carboxylic acid, 13.2 g. of thionyl chloride and 270 ml. of benzene is heated at reflux with mechanical stirring for 1 hour. The solution is cooled to 40°–45°C. and 20.5 g. of p-toluenesulfonylhydrazine is added. The resulting mixture is heated at reflux for 6 hours, cooled to 5°–10°C. and the insoluble solid removed by filtration and dried in vacuo to give 4'-(n-butyl)diphenylamine-2-carboxylic acid p-toluenesulfonylhydrazide.

A mixture of 25 g. of 4'-(n-butyl)diphenylamine-2-carboxylic acid p-toluenesulfonylhydrazide, 11.5 ml. of 10N sodium hydroxide, 100 ml. of β-ethoxyethanol, 60 ml. of water and 3.5 g. of 85% hydrazine hydrate is heated at reflux with mechanical stirring for two hours. The mixture is cooled and the solid removed by filtration and dried in vacuo to give 4'-(n-butyl)diphenylamine-2-carboxaldehyde azine.

A mixture of 7 g. of 4'-(n-butyl)diphenylamine-2-carboxaldehyde azine, 25 ml. of glacial acetic acid and 10 ml. of concentrated hydrochloric acid is heated at reflux with mechanical stirring for one hour. The solution is diluted with ice and water and basified with sodium hydroxide solution. The solid material is removed by filtration, dissolved in ether and the residue is crystallized from hexane to give 2-(n-butyl)-acridine.

EXAMPLE 4

A mixture of 85 g. of 2'-chlorodiphenylamine-2-carboxylic acid, 47.4 g. of thionyl chloride and 850 ml. of benzene is heated at reflux with mechanical stirring for 1 hour. The solution is cooled to 40°–50°C.. 76.5 g. of p-toluenesulfonylhydrazine is added and the resulting mixture is heated at reflux with stirring for six hours. The mixture is cooled to 5°–10°C. and the solid material is removed by filtration and dried in vacuo to give 2'-chlorodiphenylamine-2-carboxylic acid p-toluenesulfonylhydrazide.

A mixture of 138 g. of 2'-chlorodiphenylamine-2-carboxylic acid p-toluenesulfonylhydrazide, 66.2 ml. of 10N sodium hydroxide, 550 ml. of β-ethoxyethanol, 250 ml. of water and 19.5 g. of 85% hydrazine hydrate is heated at reflux with mechanical stirring for 2 hours. The mixture is cooled and the solid material is removed by filtration and dried in vacuo to give 2'-chlorodiphenylamine-2carboxyaldehyde azine.

A mixture of 51.5 g. of 2'-chlorodiphenylamine-2-carboxaldehyde azine, 155 ml. of glacial acetic acid and 48 ml. of concentrated hydrochloric acid is heated at reflux with mechanical stirring for 1 hour. The solution is diluted with ice and water and basified with sodium hydroxide solution. The precipitate is removed by filtration and dried in vacuo to give 4-chloroacaridine.

EXAMPLE 5

A mixture of 155 g. of 2'-trifluoromethyldiphenylamine-2-carboxylic acid, 76.5 g. of thionyl chloride and 1600 ml. of benzene is heated at reflux with mechanical stirring for 1 hour. The solution is cooled to 40°–50°C., 123 g. of p-toluenesulfonylhydrazine is added and the resulting mixture is heated under reflux with stirring for 6 hours. The suspension is cooled and the insoluble solid is removed by filtration and dried in vacuo to give 2'-trifluoromethyldiphenylamine-2-carboxylic acid p-toluenesulfonylhydrazide A mixture of 166 g. of 2'-trifluoromethyldiphenylamine-2-carboxylic acid p-toluenesulfonylhydrazide, 74 ml. of 10N sodium hydroxide, 665 ml. of β-ethoxyethanol, 415 ml. of water and 22 g. of 85% hydrazine hydrate is heated at reflux with mechanical stirring for 2 hours. The mixture is cooled and the insoluble solid is removed by filtration and dried in vacuo to give 2'-trifluoromethyldiphenylamine-2-carboxaldehyde azine.

A mixture of 37.5 g. of 2'-trifluoromethyldiphenylamine-2-carboxaldehyde azine, 113 ml. of glacial acetic acid and 30 ml. of concentrated hydrochloric acid is heated at reflux with mechanical stirring for 1 hour. The solution is diluted with ice and water and basified with sodium hydroxide solution. The insoluble solid is removed by filtration and dried in vacuo to give 4-trifluoromethylacridine.

EXAMPLE 6

A mixture of 416 g. of 4'-chlorodiphenylamine-2-carboxylic acid p-toluenesulfonylhydrazide (prepared as in Example 1), 120 g. of sodium hydroxide, 1600 ml. of β-ethoxyethanol, 1200 ml. of water and 114.5 g. of semicarbazide hydrochloride is heated at reflux with mechanical stirring for 1.5 hours. To the hot solution is added an additional 600 ml. of water and the mixture is cooled. The solid material is removed by filtration and dried in vacuo to give 4'-chlorodiphenylamine-2-carboxaldehyde semicarbazone.

A mixture of 72 g. of 4'-chlorodiphenylamine-2-carboxaldehyde semicarbazone, 200 ml. of glacial acetic acid and 61 ml. of concentrated hydrochloric acid is heated at reflux with stirring for one hour. The reaction mixture is worked up as in Example 1 to give 2-chloroacridine.

EXAMPLE 7

A mixture of 29.2 g. of 3'-bromodiphenylamine-2-carboxylic acid, 13.5 g. of thionyl chloride and 200 ml. of cyclohexane is heated at reflux for one hour with stirring. The solution is then cooled to 40°–50°C. and 20.6 g. of benzenesulfonylhydrazine is added. The resulting mixture is heated at reflux for 6 hours with stirring, cooled and filtered to give 3'-bromodiphenylamine-2-carboxylic acid benzenesulfonylhydrazide.

A mixture of 44 g. of 3'-bromodiphenylamine-2-carboxylic acid benzenesulfonylhydrazide, 12 g. of sodium hydroxide, 160 ml. of β-ethoxyethanol, 120 ml. of water and 12.8 g. of thiosemicarbazide hydrochloride is heated at reflux with stirring for 2 hours. An additional 60 ml. of water is added to the hot solution. The mixture is cooled and filtered to give 3'-bromodiphenylamine-2-carboxaldehyde thiosemicarbazone.

The above prepared thiosemicarbazone is refluxed with glacial acetic acid and concentrated hydrochloric acid by the procedure of Example 6 to give 3-bromoacridine and 1-bromoacridine.

EXAMPLE 8

A mixture of 140 g. of 4'-chlorodiphenylamine-2-carboxylic acid p-toluenesulfonylhydrazide (prepared as in Example 1), 27 g. of sodium hydroxide, 36.4 g. of phenylhydrazine. 500 ml. of β-ethoxyethanol and 200 ml. of water is heated at reflux with mechanical stirring for 2 hours. The mixture is cooled and the solid material is removed by filtration and dried in vacuo to give 4'-chlorodiphenylamine-2-carboxaldehyde phenylhydrazone.

A mixture of 80 g. of 4'-chlorodiphenylamine-2-carboxaldehyde phenylhydrazone, 200 ml. of glacial acetic acid and 33 ml. of concentrated sulfuric acid is heated at reflux with stirring for 1 hour. The solution is diluted with ice and water, basified with sodium hydroxide solution and filtered to give 2-chloroacridine.

EXAMPLE 9

A mixture of 52 g. of 4'-methylthiodiphenylamine-2-carboxylic acid, 26.4 g. of thionyl chloride and 600 ml. of benzene is heated at reflux with stirring for one hour. The solution is cooled to 40°–50°C. and 41 g. of p-toluenesulfonylhydrazine is added. The resulting mixture is heated at reflux with stirring for 5 hours, cooled and the solid material removed by filtration and dried in vacuo ato give 4'-methylthiodiphenylamine-2-carboxylic acid p-toluenesulfonylhydrazide.

A mixture of 75 g. of 4'-methylthiodiphenylamine-2-carboxylic acid p-toluenesulfonylhydrazide, 35 ml. of 10N sodium hydroxide solution, 320 ml. of β-ethoxyethanol, 200 ml. of water and 10 g. of 85% hydrazine hydrate is heated at reflux with stirring for 2 hours. The mixture is cooled and the solid material is removed by filtration and dried in vacuo to give 4'-methylthiodiphenylamine-2-carboxaldehyde azine.

A mixture of 7 g. of 4'-methylthiodiphenylamine-2-carboxaldehyde azine, 25 ml. of glacial acetic acid and 7.5 ml. of concentrated hydrochloric acid is heated at reflux with stirring for one hour. The solution is diluted with ice and water and basified with sodium hydroxide solution. The insoluble solid is removed by filtration and dried in vacuo to give 2-methylthioacridine.

EXAMPLE 10

A mixture of 35 g. of 4'-methyldiphenylamine-2-carboxylic acid, 24 g. of thionyl chloride and 500 ml. of cyclohexane is heated at reflux with stirring for two hours. The solution is cooled and 48 g. of 2,5-dichlorobenzenesulfonylhydrazine is added. The resulting mixture is heated at reflux for 6 hours, then cooled and filtered to give 4'-methyldiphenylamine-2-carboxylic acid 2,5-dichlorobenzenesulfonylhydrazide.

A mixture of 27 g. of the above prepared 2,5-dichlorobenzenesulfonylhydrazide, 6.4 g. of sodium carbonate, 110 ml. of β-ethoxyethanol, 68 ml. of water and 3.7 g. of 85% hydrazine hydrate is heated at 100°C. with stirring for three hours. The mixture is cooled and filtered to give 4'-methyldiphenylamine-2-carboxaldehyde azine.

A mixture of 7 g. of the above prepared azine 25 ml. of formic acid and 10 ml. of phoshporic acid is heated at reflux for two hours. The solution is diluted with ice and water, basified with sodium hydroxide and filtered to give 2-methylacridine.

EXAMPLE 11

A mixture of 43 g. of 2'-methoxydiphenylamine-2-carboxylic acid, 24 g. of thionyl chloride and 500 ml. of cyclohexane is heated at reflux with stirring for one hour. The solution is cooled to 45°C. and 34.4 g. of benzenesulfonylhydrazine is added. The mixture is heated for six hours at reflux, then cooled and filtered to give 2'-methoxydiphenylamine-2-carboxylic acid benzenesulfonylhydrazide.

A mixture of 13 g. of the above prepared benzenesulfonylhydrazide, 3.8 g. of potassium hydroxide, 3.6 g of phenylhydrazine and 50 ml. of ethylene glycol is heated at 200°C. with stirring for 2 hours. The mixture is cooled and filtered to give 2'-methoxydiphenylamine-2-carboxaldehyde phenylhydrazone.

A mixture of 7.9 g. of 2'-methoxydiphenylamine-2-carboxaldehyde phenylhydrazone, 10 ml. of concentrated sulfuric acid and 50 ml. of ethylene glycol is heated at 150°C. for 1 hour. The solution is diluted with ice and water, basified with sodium hydroxide solution and filtered to give 4-methoxyacridine.

EXAMPLE 12

A mixture of 34.5 g. of 4'-trifluoromethylsulfonyldiphenylamine-2-carboxylic acid, 13.5 g. of thionyl chloride and 200 ml. of cyclohexane is heated at reflux with stirring for 1 hour. The solution is cooled to 40°-50°C. and 22.3 g. of p-toluenesulfonylhydrazine is added. The mixture is heated at reflux with stirring for 6 hours, then cooled and filtered to give 4'-trifluoromethylsulfonyldiphenylamine-2-carboxylic acid p-toluenesulfonylhydrazide.

A mixture of 12.8 g. of the above prepared p-toluenesulfonylhydrazide, 3.5 g. of potassium carbonate, 45 ml. of β-methoxyethanol, 25 ml. of water and 1.5 g. of 85% hydrazine hydrate is heated at reflux for two hours with stirring. The mixture is cooled and filtered to give 4'-trifluoromethylsulfonyldiphenylamine-2-carboxaldehyde azine.

A mixture of 8.8 g. of the above prepared azine, 7.5 ml. of concentrated hydrochloric acid and 20 ml. of β-ethoxyethanol is heated at reflux for one hour. The solution is diluted with ice and water, basified with sodium hydroxide solution and filtered to give 2-trifluoromethylsulfonylacridine.

EXAMPLE 13

A mixture of 47 g. of 4'-(N,N-dimethylsulfamoyldiphenylamine-2-carboxylic acid benzenesulfonylhydrazide (prepared from 4'-(N,N-dimethylsulfamoyl)diphenylamine-2-carboxylic acid by the procedure of Example 7), 12.0 g. of sodium hydroxide, 160 ml. of β-ethoxyethanol, 120 ml. of water and 11.4 of semicarbazide hydrochloride is heated at reflux with stirring for 2 hours. Water (60 ml.) is added to the hot solution and the mixture is cooled and filtered to give 4'-(N,N-dimethylsulfamoyl)diphenylamine-2-carboxyaldehyde semicarbazone.

A mixture of 36 g. of the above prepared semi-carbazone, 150 ml. of glacial acetic acid and 48 ml. of concentrated hydrochloric acid is heated at reflux with stirring for 1 hour. The solution is diluted with ice and water, basified with sodium hydroxide solution and filtered to give 2-(N,N-dimethylsulfamoyl)acridine.

EXAMPLE 14

A mixture of 9.5 g. of diphenylamine-2-carboxylic acid p-toluenesulfonylhydrazide, 5 ml. of 10N sodium hydroxide, 1.5 g. of 85% hydrazine hydrate, 50 ml. of β-methoxyethanol and 20 ml. of water is heated at reflux with stirring for 2 hours. The mixture is cooled and filtered to give diphenylamine-2-carboxyaldehyde azine.

A mixture of 5.7 g. of diphenylamine-2-carboxaldehyde azine, 7.5 ml. of concentrated hydrochloric acid and 100 ml. of β-methoxyethanol is heated at 100°C. for 2 hours. The solution is diluted with water and ice, basified with aqueous sodium hydroxide solution and filtered to give acridine.

EXAMPLE 15

A mixture of 118 g. of 2-bromo-5-chlorobenzoic acid, 93 g. of aniline, 69 g. of potassium carbonate, 6 g. of copper-bronze powder and 500 ml. of water is heated at reflux for 5 hours with mechanical stirring. The mixture is cooled slightly and clarified by filtration. The filtrate is cooled and acidified with concentrated hydrochloric acid. The solid which precipitates is filtered off, washed with water, dried and recrystallized from toluene to give 5-chloro-N-phenylanthranilic acid.

A mixture of 24.9 g. of 5-chloro-N-phenylanthranilic acid, 12.0 g. of thionyl chloride and 250 ml. of benzene is heated at reflux with mechanical stirring for 1 hour. The resulting solution is cooled to 40°-50°C. and 18.6 g. of p-toluenesulfonylhydrazine is added. The resulting mixture is heated at reflux with stirring for four hours and cooled. The solid material is filtered off, washed with benzene, dried and recrystallized from methanol to give 5-chloro-N-phenylanthranilic acid p-toluenesulfonylhydrazide.

A mixture of 17 g. of 5-chloro-N-phenylanthranilic acid p-toluenesulfonylhydrazide, 8 ml. of 10N sodium hydroxide, 70 ml. of β-ethoxyethanol, 50 ml. of water and 3 g. of 85% hydrazine hydrate is heated at reflux with mechanical stirring for 2 hours. The mixture is cooled and the solid material is filtered off, washed with water, dried and recrystallized from dimethylformamide to give 4-chlorodiphenylamine-2-carboxaldehyde azine.

A mixture of 4.6 g. of 4-chlorodiphenylamine-2-carboxaldehyde azine, 15 ml. of glacial acetic acid and 5 ml. of concentrated hydrochloric acid is heated at reflux with mechanical stirring for one hour. The resulting solution is quenched in a mixture of ice and water and basified with ammonia. The solid material is filtered off, washed with water and dried to give 2-chloroacridine.

EXAMPLE 16

A mixture of 75 g. of 2-bromo-4-trifluoromethylbenzoic acid, 55 g. of aniline, 41.5 g. of potassium carbonate, 4 g. of copper-bronze powder and 500 ml. of water is heated under reflux with mechanical stirring for two hours. The mixture is clarified by filtration and the filtrate is acidified to pH 1–2 with concentrated hydrochloric acid. The solid material is filtered off, washed with water, dried and recrystallized from toluene to give 4-trifluoromethyl-N-phenylanthranilic acid.

A mixture of 24 g. of 4-trifluoromethyl-N-phenylanthranilic acid, 10.4 g. of thionyl chloride and 300 ml. of benzene is heated at reflux with mechanical stirring for one hour. The resulting solution is cooled to 40°–50°C. and 16.2 g. of p-toluenesulfonylhydrazine is added. The mixture is heated at reflux with mechanical stirring for four hours and then cooled. The solid material is filtered off, separated, washed with benzene, dried and recrystallized from β-ethoxyethanol to give 4-trifluoromethyl-N-phenylantranilic acid p-toluenesulfonylhydrazide.

A mixture of 18 g. of 4-trifluoromethyl-N-phenylanthranilic acid p-toluenesulfonylhydrazide, 8 ml. of 10N sodium hydroxide, 70 ml. of β-ethoxyethanol, 50 ml of water and 3 g. of 85% hydrazine hydrate is heated at reflux for 2 hours with mechanical stirring. The mixture is cooled and the solid material is filtered off, washed with water, dried and recrystallized from β-ethoxyethanol to give 5-trifluoromethyldiphenylamine-2-carboxaldehyde azine.

A mixture of 5.3 g. of 5-trifluoromethyldiphenylamine-2-carboxaldehyde azine, 16 ml. of glacial acetic acid and 4 ml. of concentrated hydrochloric acid is heated at reflux with mechanical stirring for 1 hour. The resulting solution is quenched in ice and basified with ammonia. The solid material is filtered off, washed with water and dried to give 3-trifluoromethylacridine.

What is claimed is:
1. A compound of the formula:

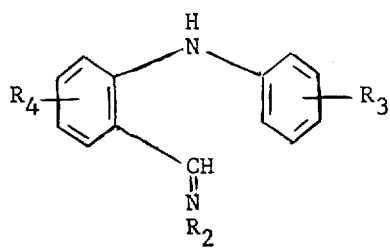

in which:
R$_3$ and R$_4$ are hydrogen, halogen having an atomic weight of less than 80, lower alkyl, lower alkoxy, trifluoromethyl, trifluoromethylsulfonyl, dimethylsulfamoyl or lower alkylthio, at least one of R$_3$ and R$_4$ being hydrogen and
R$_2$ is

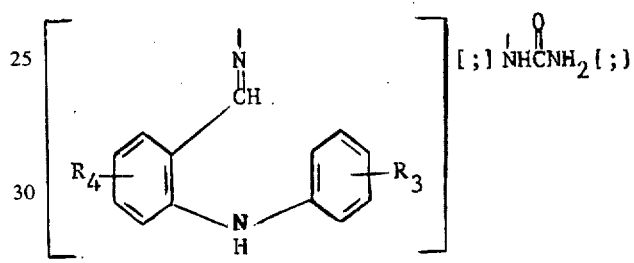

or

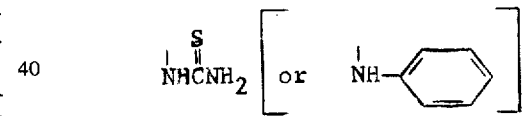

2. A compound according to claim 1, said compound being 4'-chlorodiphenylamine-2-carboxaldehyde semicarbazone.

* * * * *

UNITED STATES PATENT AND TRADEMARK OFFICE
CERTIFICATE OF CORRECTION

PATENT NO. : 3,919,312
DATED : November 11, 1975
INVENTOR(S) : Elvin L. Anderson and Harold Graboyes It is certified that error appears in the above-identified patent and that said Letters Patent are hereby corrected as shown below:

Column 3, line 62, "-2'-" should read -- -2- -- .

Column 5, line 28, "4-chloroacaridine" should read -- 4-chloroacridine -- .

Column 6, line 55, "ato" should read -- to -- .

Column 7, line 22, "phoshporic" should read -- phosphoric --

Column 10, lines 23-43, delete the bracketed material and insert a period at the end of the claim, that is column 10, lines 23-43 should read:

and column 10, lines 38-43, should read:

Signed and Sealed this ninth Day of March 1976

[SEAL]

Attest:

RUTH C. MASON
*Attesting Officer*

C. MARSHALL DANN
*Commissioner of Patents and Trademarks*